United States Patent [19]

Furuta et al.

[11] Patent Number: 5,132,363
[45] Date of Patent: Jul. 21, 1992

[54] THERMOPLASTIC RESIN COMPOSITION

[75] Inventors: Motonobu Furuta, Ichihara; Kazuki Wakamatsu, Sodegaura; Takashi Maruyama; Mitsuji Tsuji, both of Ichihara, all of Japan

[73] Assignee: Sumitomo Chemical Co., Ltd., Osaka, Japan

[21] Appl. No.: 311,898

[22] Filed: Feb. 15, 1989

[30] Foreign Application Priority Data

Feb. 15, 1988 [JP] Japan .................................. 63-33445
Mar. 15, 1988 [JP] Japan .................................. 63-62950
Mar. 29, 1988 [JP] Japan .................................. 63-77867

[51] Int. Cl.$^5$ .................. C08L 51/04; C08L 53/02; C08L 71/12
[52] U.S. Cl. ............................ 525/68; 525/92; 525/152; 525/905
[58] Field of Search .............. 525/68, 92, 905, 152

[56] References Cited

U.S. PATENT DOCUMENTS

| 4,166,055 | 8/1979 | Lee, Jr. | 525/92 |
| 4,713,416 | 12/1987 | Giudice et al. | 525/68 |

FOREIGN PATENT DOCUMENTS

| 0135726 | 4/1985 | European Pat. Off. |
| 0142166 | 5/1985 | European Pat. Off. |
| 56-22344 | 5/1981 | Japan. |
| 60-118739 | 6/1985 | Japan. |

*Primary Examiner*—Jacob Ziegler
*Attorney, Agent, or Firm*—Birch, Stewart, Kolasch & Birch

[57] ABSTRACT

Disclosed are thermoplastic resin compositions, comprising:

(a) a polyphenylene ether resin or a resin composition containing a polyphenylene ether, (b) a modified propylene polymer, or a propylene based resin composition containing the modified propylene polymer and/or a propylene polymer, and (c) optionally, a rubbery substance, wherein the proportion of the component (a) to the sum of the components (a) and (b) is 1 to 90% by weight, and that of the component (b) to the sum of the components (a) and (b) is 99 to 10% by weight, and when the component (c) is present, the proportion of the component (c) to the sum of the components (a) and (b) is 1 to 50 parts by weight per 100 parts by weight of (a) plus (b).

13 Claims, No Drawings

THERMOPLASTIC RESIN COMPOSITION

BACKGROUND OF THE INVENTION

1. Field of the Invention

This invention relates to a novel thermoplastic resin composition which can be utilized as a material for producing molded articles by injection molding, extrusion molding or a like means.

2. Prior Art

Generally, polyphenylene ethers are excellent in heat resistance, hot water resistance, dimension stability, and mechanical and electrical properties. On the other hand, they have disadvantages; for example, they show unsatisfactory moldability due to their high melt viscosity, poor chemical resistance, and low impact resistance.

Known methods for improving moldability by lowering the melt viscosity of polyphenylene ethers while maintaining their excellent properties include use of a mixture of a polyphenylene ether and a polystyrene resin. However, these known methods still fail to improve chemical resistance.

On the other hand, propylene polymers are not only excellent in various properties such as moldability, toughness, water resistance, chemical resistance, etc. but also they have low specific gravity and are cheap in cost; they have been widely used as a material for preparing various molded articles, films, sheets, etc.

However, the propylene polymers have defects or points which need to be improved in heat resistance, rigidity, impact resistance, coatability, adhesiveness, etc., which makes an obstacle in developing new practical utility. In particular, improvement in the heat resistance and impact resistance thereof is strongly desired.

Naturally, it may be expected to blend a polyphenylene ether and a propylene polymer to prepare a resin composition which could have the advantages of the both polymers and which could have improved moldability and impact resistance, and thus a wide possibility of new application would be open.

Blending a polyphenylene with a propylene polymer, however, actually gives rise to a resin composition in which miscibility of the both polymers is poor so that molded articles obtained from such a blend as by injection molding suffers phase separation between the polyphenylene ether and the propylene polymer, thereby providing articles having extremely poor appearance and poor mechanical properties, which are unsatisfactory for practical purposes.

A method for improving the miscibility between a polyphenylene ether and a propylene polymer is known as described in Published Japanese Patent Publication No. 56-22344, in which method a polyphenylene ether is blended with a propylene polymer having bound thereon a styrene based monomer by graft copolymerization. This method, however, fails to provide a composition having excellent impact resistance.

In view of the above points, the present inventors have studied intensively and extensively in order to develop effective technology, and as the result they have completed this invention.

SUMMARY OF THE INVENTION

Therefore, this invention provides a thermoplastic resin composition, comprising:

(a) a polyphenylene ether resin or a resin composition containing a polyphenylene ether, (b) a modified propylene polymer, or a propylene based resin composition containing the modified propylene polymer and/or a propylene polymer, and (c) optionally, a rubbery substance, wherein the proportion of the component (a) to the sum of the components (a) and (b) is 1 to 90% by weight, and that of the component (b) to the sum of the components (a) and (b) is 99 to 10% by weight, and when the component (c) is present, the proportion of the component (c) to the sum of the components (a) and (b) is 1 to 50 parts by weight per 100 parts by weight of (a) plus (b).

DETAILED DESCRIPTION OF THE INVENTION

The polyphenylene ether used in this invention as the component (a) is a polymer obtainable by oxidative polymerization of at least one phenol compound represented by the general formula (1)

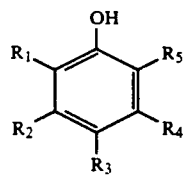

(1)

wherein $R_1$, $R_2$, $R_3$, $R_4$ and $R_5$, each represents a hydrogen atom, a halogen atom, a hydrocarbon group or a substituted hydrocarbon group, provided that one of $R_1$, $R_2$, $R_3$, $R_4$ and $R_5$ is a hydrogen atom, with oxygen or an oxygen-containing gas using an oxidative coupling catalyst.

Concrete examples of the groups represented by $R_1$, $R_2$, $R_3$, $R_4$ and $R_5$ include a hydrogen atom, chlorine, bromine, fluorine, iodine, a methyl group, an ethyl group, an n- or iso-propyl group, a pri-, sec- or tert-butyl group, a chloroethyl group, a hydroxyethyl group, a phenylethyl group, a benzyl group, a hydroxymethyl group, a carboxyethyl group, a methoxycarbonylethyl group, a cyanoethyl group, a phenyl group, a chlorophenyl group, a methylphenyl group, a dimethylphenyl group, an ethylphenyl group, an allyl group, etc.

Concrete examples of the compounds represented by the general formula (1) include phenol, o-, m- or p-cresol, 2,6-, 2,5-, 2,4- or 3,5-dimethylpheonol, 2-methyl-6-phenylphenol, 2,6-diphenylphenol, 2,6-diethylphenol, 2-methyl-6-ethylphenol, 2,3,5-, 2,3,6- or 2,4,6-trimethylphenol, 3-methyl-6-tert-butylphenol, thymol, 2-methyl-6-allylphenol, etc. In addition, there may be used those phenol compounds outside the scope of the general formula (1), for example, those obtainable by copolymerizing a polyhydroxy aromatic compound such as bisphenol A, tetra-bromobisphenol A, resorcin, hydroquinone, Novolak resin, etc. with one of the compounds represented by the general formula (1).

Of the above-described phenol compounds, preferred examples include homopolymers of 2,6-dimethylphenol (2,6-xylenol) or 2,6-diphenylphenol, or copolymers of a large amount of 2,6-xylenol and a small amount of 3-methyl-6-tert-butylphenol or 2,3,6-trimethylphenol.

The oxidative coupling catalyst which can be used in the oxidative polymerization of the phenol compounds is not limited particularly but any catalysts can be used that can catalyze such polymerization reaction. Representative examples thereof include catalysts comprising a copper (I) salt and a tertiary amine such as copper (I) chloride-triethylamine and copper (I) chloride-pyridine, catalysts comprising a copper (II) salt, an amine and an alkali metal hydroxide such as copper (II) chloride-pyridine-potassium hydroxide, catalysts comprising a manganese salt and a primary amine such as manganese chloride-ethanolamine and manganese acetate-ethylenediamine, catalysts comprising a manganese salt and an alcoholate or phenolate such as manganese chloride-sodium methylate and manganese chloride-sodium phenolate, catalysts comprising a cobalt salt and a tertiary amine, and the like.

It is known that the physical properties and the like of polyphenylene ethers vary depending on the reaction temperature of oxidative polymerization to obtain the polymer, i.e., high temperature polymerization, which is performed at temperatures higher than 40° C., and low temperature polymerization, which is carried out at temperatures not higher than 40° C., result in the production of polyphenylene ethers with different physical properties. In this invention, both the high and low temperature polymerization reactions can be used.

The polyphenylene ethers which can be used in this invention as the component (a) may include, in addition to the polyphenylene ethers described above, those to which one or more styrene polymers or other polymers are attached by graft copolymerization. The graft copolymers can be prepared by subjecting one or more styrene monomers and/or other monomers to organic peroxide graft polymerization in the presence of a polyphenylene ether as described in, for example, Published Japanese Patent Publication Nos. 47-47862, 48-12197, 49-5623, 52-38596 and 52-30991. Alternatively, they can also be prepared by melt-kneading the polyphenylene ether together with the polystyrene based polymer and a radical generating agent as described in, for example, Published Unexamined Japanese Patent Application No. 52-142799.

The resin composition containing the polyphenylene ether as the component (a) used in this invention is a resin composition comprising a polyphenylene ether and an alkenyl aromatic resin and/or rubber-modified alkenyl aromatic resin.

The alkenyl aromatic resin is selected from those resins which contain at least 25% by weight of a polymer unit derived from a monomer represented by the general formula (2)

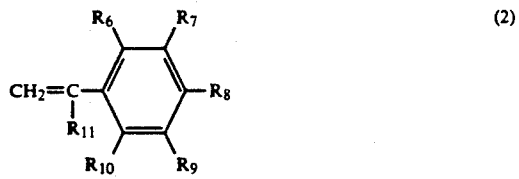

wherein $R_6$, $R_7$, $R_8$, $R_9$ and $R_{10}$, each represents a hydrogen atom, a halogen atom, an unsubstituted or substituted hydrocarbyl group, or an unsubstituted or substituted hydrocarbyloxy group, and $R_{11}$ represents a hydrogen atom, or a lower alkyl group having 1 to 4 carbon atoms.

Specific examples of $R_6$, $R_7$, $R_8$, $R_9$ and $R_{10}$ in the general formula (2) include a hydrogen atom, a halogen atom such as chlorine, bromine and iodine, a hydrocarbyl group such as a methyl group, an ethyl group, a propyl group, a vinyl group, an allyl group, a benzyl group and a methylbenzyl group, a substituted hydrocarbyl group such as a chloromethyl group and a bromomethyl group, a hydrocarbyloxy group such as a methoxy group, an ethoxy group and a phenoxy group, and a substituted hydrocarbyloxy group such as a monochloromethoxy group.

Specific examples of $R_{11}$ include a hydrogen atom and a lower alkyl group such as a methyl group and an ethyl group.

Specific examples of the styrene monomer include styrene, 2,4-dichlorostyrene, p-methoxystyrene, p-methylstyrene, p-phenylstyrene, p-divinylbenzene, p-chloromethoxystyrene, α-methylstyrene, o-methyl-α-methylstyrene, m-methyl-α-methylstyrene, p-methyl-α-methylstyrene and p-methoxy-α-methylstyrene. They may be used alone or in admixture. Of these, styrene is preferred.

Specific examples of the alkenyl aromatic resin include homopolymers of styrene monomers (e.g., styrene, chlorostyrene and α-methylstyrene) such as polystyrene, polychlorostyrene and poly-α-methylstyrene, and copolymers of the styrene monomers and styrene-containing monomers such as styrene-acrylonitrile copolymer, styrene-divinylbenzene copolymer, and styrene-acrylonitrile-α-methylstyrene copolymer. Of these, preferred are homopolystyrene, styrene-α-methylstyrene copolymer, styrene-acrylonitrile copolymer, styrene-α-chlorostyrene copolymer, and styrenemethyl methacrylate copolymer. Homopolystyrene is particularly preferred.

The rubber-modified alkenyl aromatic resin used in this invention refers to a resin which forms a binary phase system composed of a matrix of an alkenyl aromatic resin and rubber particles dispersed therein. This resin can be prepared by mechanically mixing a rubbery substance (c) described hereinbelow and the alkenyl aromatic resin, or by dissolving the rubbery substance (c) in the alkenyl aromatic monomer and then polymerizing the alkenyl aromatic monomer. The latter method is employed on an industrial scale in the production of impact resistant polystyrenes. The rubber-modified alkenyl aromatic resin include also a mixture of one prepared by the latter method and a rubbery substance and/or an alkenyl aromatic resin.

The proportion at which polyphenylene ether and the alkenyl aromatic resin and/or rubber-modified alkenyl aromatic resin are mixed each other can be varied widely, for example, in the range of 1 to 99% by weight of the polyphenylene ether and 99 to 1% by weight of the alkenyl aromatic resin and/or rubber-modified alkenyl aromatic resin. Within this range, optimal composition can be selected depending on the object and desired application.

The propylene polymer used in this invention as the component (b) is a propylene homopolymer or a propylene copolymer. By the term "propylene copolymer" is meant a random or block copolymer of propylene and an α-olefin having 2 to 18 carbon atoms.

Specific examples of the propylene copolymer include ethylene-propylene copolymer, propylene-butene-1 copolymer, propylene-hexene-1 copolymer, propylene-4-methylpentene-1 copolymer, and propylene-octene-1 copolymer.

The propylene polymer may be the propylene homopolymer or the propylene copolymer alone, or it may be a mixture of one or more of them.

As for the propylene polymer used as the component (b), appropriate propylene polymers can be selected and used depending on commercial needs. In particular, in the field where high thermal resistance and high rigidity are required, it is preferred to use a crystalline propylene polymer composition as a propylene polymer composition of the component (b), obtainable by blending a propylene polymer with a polymer of a vinylcycloalkane having at least 6 carbon atoms. It is also preferred to use a highly crystalline propylene polymer as the propylene polymer. Hereinafter, the above-described propylene polymer will be explained in greater detail.

The polymer of vinylcycloalkane (vinylcycloalkane polymer) to be blended with the propylene polymer means a homopolymer of vinylcycloalkane, a random copolymer of the vinylcycloalkane and a small amount of another vinylcycloalkane or an α-olefin, or a block copolymer of the vinylcycloalkane and an α-olefin.

The vinylcycloalkane block copolymer includes multistep copolymers of various α-olefins with vinylcycloalkanes such as (1) a copolymer obtained by polymerizing a vinylcycloalkane in a first step, and then performing the homopolymerization of propylene in a second step, (2) a copolymer obtained by polymerizing a vinylcycloalkane in a first step, and then effecting the random copolymerization of propylene with one or more α-olefins in a second step, and (3) a copolymer prepared by homopolymerizing propylene in a first step, polymerizing a vinylcycloalkane in a second step, and then effecting the homopolymerization of propylene or the random copolymerization of propylene with one or more other α-olefins in a third step.

Of these vinylcycloalkane polymers, preferred polymers are the block copolymers, and more preferably the block copolymers with propylene as indicated in (1) to (3) above Specific examples of the vinylcycloalkane having not smaller than 6 carbon atoms which can be used in this invention include vinylcyclobutane, vinylcyclopentane, vinyl-3-methylcyclopentane, vinylcyclohexane, vinyl-2-methylcyclo-hexane, vinyl-3-methylcyclohexane, and vinylnorbornane. Of these, preferred are vinylcycloalkanes having not smaller than 8 carbon atoms.

The amount of the vinylcycloalkane unit to be blended with the propylene polymer is such that improving effect can be achieved without changing the inherent physical properties of the propylene polymer, and more specifically, 0.05 to 10,000 ppm by weight, preferably 0.5 to 5,000 ppm by weight, and more preferably 0.5 to 1,000 ppm by weight.

The propylene polymer and the vinylcycloalkane polymer used in this invention can be advantageously prepared with a catalyst system comprising a titanium compound and an organoaluminium compound. As for the titanium compound, there can be used titanium trichloride catalysts commercially available from Toyo Stoffer Co., Toho Titanium Co., Marubeni Solvay Co., etc. Also, there can be used those catalysts which comprise a magnesium compound as a carrier and a titanium compound. As for the organo-aluminium compound, preferred is an alkylaluminium compound represented by formula (3)

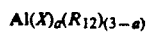

$$Al(X)_a(R_{12})_{(3-a)} \quad (3)$$

wherein X represents a halogen atom, an alkoxy group, or a hydrogen atom, R represents an alkyl group having 1 to 18 carbon atoms, a is a number of $0 \leq a < 3$. Specific examples of the organoaluminium include $Al(CH_3)_3$, $Al(C_2H_5)_3$, $Al(C_2H_5)_2Cl$, $Al(C_2H_5)_2Br$, $Al(C_2H_5)_2(OC_2H_5)$, $Al(C_2H_5)_2-(OC_4H_9)$, $Al(C_2H_5)(OC_4H_9)_2$, $Al(C_2H_5)Cl_2$, $Al(C_4H_9)_3$, $Al(C_4H_9)_2Cl$, $Al(C_6H_{13})_3$, $Al(C_6H_{13})_2Cl$, etc. and mixtures thereof. In order to improve stereoregularity, it is possible to produce the propylene polymer and the vinylcycloalkane polymer with adding an electron donor such as an ester of a carboxylic acid, phosphoric acid or silicic acid.

The "highly crystalline propylene polymer" used in this invention means a crystalline propylene polymer of which the propylene homopolymer portion or that portion in the first segment polymerized in the first step of the block copolymer production contains a boiling-heptane-insoluble moiety having an isotactic pentad fraction of at least 0.970, or a crystalline propylene polymer of which the propylene homopolymer portion contains a boiling-heptane-insoluble moiety having an isotactic pentad fraction of at least 0.970, a boiling-heptane-soluble moiety in an amount of not larger than 5.0% by weight and a 20° C. xylene-soluble moiety in an amount of not larger than 2.0% by weight.

The isotactic pentad fraction of the boiling-heptane-insoluble moiety, the content of the boiling-heptane-soluble moiety and the content of the 20° C. xylene-soluble polymer can be determined as described below.

That is, after completely dissolving 5 g of the propylene polymer in 500 ml of boiling xylene, the temperature of the resulting solution is decreased to 20° C. and is left at this temperature for 4 hours, followed by filtration to separate a 20° C. xylene-insoluble moiety. The filtrate is concentrated to dryness to evaporate xylene and dried at 60° C. under reduced pressure to obtain a 20° C. xylene-soluble moiety. A value obtained by dividing this dry weight by the weight of the charge sample and expressed as percentage is defined as the content of the 20° C. xylene-soluble moiety. After drying, the 20° C. xylene-insoluble moiety is extracted with boiling n-heptane for 8 hours using Soxhlet apparatus. The residue obtained is called a boiling-heptane-insoluble moiety, and a value obtained by subtracting the dry weight of the moiety from the weight (5 g) of the charge sample and dividing the resulting amount by the weight of the charge sample, expressed in percentage, is defined as the content of the boiling-heptane-soluble moiety. The "isotactic pentad fraction" means the amount of isotactic linkage expressed in pentad unit in the molecular chain of the propylene polymer, i.e., a fraction of a propylene monomer unit present in the center of a linkage composed of 5 propylene monomer units continuously bonded to each other with meso-bonding, which can be measured by using $^{13}$C-NMR as described in Macromolecules, 6, 925 (1973) by A. Zambelli et al. The assignment of NMR peaks, however, is determined based on the teaching of Macromolecules, 8, 687 (1975).

More particularly, the isotactic pentad fraction is measured as the area fraction of mmmm peak in total absorption peak in the region of methyl carbon in $^{13}$C-NMR spectrum. The isotactic pentad fraction measured by this method of CRM No. M19-14 Polypropylene PP/MWD/2, an NPL standard substance of National Physical Laboratory, United Kingdom, was 0.944.

Such highly crystalline polypropylene as described above can be prepared by methods disclosed in, for example, Published Unexamined Japanese Patent Application Nos. 60-28405, 60-228504, 61-218606, and 61-287917.

In the field where high rigidity is required, it is effective to further improve the crystallinity of the crystalline propylene polymer. It is preferred to blend a commonly used nuclei generating agent to the highly crystalline propylene polymer. It is known that aluminium or sodium salts of aromatic carboxylic acids (cf. Published Unexamined Japanese Patent Application No. 58-80829), aromatic carboxylic acids, metal salts of aromatic phosphoric acids and sorbitol derivatives (cf. Published Japanese Patent Publication No. 55-12460 and Published Unexamined Japanese Patent Application No. 58-129036), for example, when added, serve as a nuclei generating agent (hereinafter, referred to as "nucleating agent") for crystals to give rise to high crystallinity.

It is also known that in addition to these nucleating agents, the above-described vinylcycloalkane polymers having not smaller than 6 carbon atoms can serve as a nucleating agent effectively as described in Published Unexamined Japanese Patent Application No. 62-1738.

More particularly, a highly crystalline polypropylene composition obtained by blending the vinylcycloalkane polymer having not smaller than 6 carbon atoms with the highly crystalline propylene polymer such that the composition contains 0.05 to 10,000 ppm by weight of the vinylcycloalkane unit has higher crystallinity.

The highly crystalline propylene polymer and the vinylcycloalkane polymer can be blended by a conventional method which is applied to the blending of ordinary α-olefin polymers. That is, powders of the both polymers, granulated pellets of the both polymers, or powder of one polymer and granulated pellets of the other polymer are mixed with each other with a Henschel mixer or a like mixer, and melt-kneaded with a Brabender mixer, a roll mixer, a Banbury mixer or a granulator.

The component (b) used in the resin composition in this invention is a modified propylene polymer alone, which is obtained by modifying the above-described propylene polymer (that is, the propylene homopolymer, the propylene copolymer, the highly crystalline propylene polymer, or the propylene polymers obtained by blending the vinylcycloalkane polymer with the propylene polymers), or a mixture of the modified propylene polymer and non-modified propylene polymer. If necessary or desired, various additives such as anti-oxidants, heat stabilizers, light stabilizers, nucleating agents, lubricants, anti-static agents, inorganic or organic coloring agents, rust preventives, crosslinking agents, foaming agents, plasticizers, fluorescent agents, surface smoothing agents, surface gloss improving agents, etc. may be added to the component (b) in the production step or the processing step thereafter.

As for the modified propylene polymer used as the component (b) in this invention, there can be used among others those obtained by graft copolymerizing the above-described propylene polymer with an alkenyl aromatic monomer.

The alkenyl aromatic monomer which can be used in the modification of the propylene polymers is one represented by the above-described general formula (2). Of these alkenyl aromatic monomers, a styrene monomer can be used preferably.

As for the modified propylene polymer used as the component (b) in this invention, there can be used a modified propylene polymer obtained by graft copolymerizing the alkenyl aromatic monomer with one or more other monomers copolymerizable therewith. Thermoplastic resins having high mechanical properties can be obtained by appropriately selecting monomers with the alkenyl aromatic monomer, graft copolymerizing them with the propylene polymer and blending.

The graft modified propylene polymer used as the component (b) in this invention can be obtained by graft copolymerizing a graft monomer (alkenyl aromatic monomer and if desired, one or more other monomers copolymerizable therewith) to the propylene polymer in the presence of a peroxide, if necessary or desired.

Various known methods can be used upon grafting the graft monomer to the propylene polymer.

For example, there can be used (i) a method in which the propylene polymer, a graft monomer and a peroxide are mixed with each other and the resulting mixture is melt-kneaded in a melt-kneading apparatus to effect grafting, (ii) a method in which after the propylene polymer is dispersed in water together with the graft monomer, a peroxide is added to the resulting dispersion in nitrogen gas atmosphere followed by heating for reaction with stirring, the reaction mixture is cooled after the reaction, washed by filtration and dried to obtain a graft-propylene polymer, (iii) a method in which the propylene polymer is irradiated with ultraviolet ray or radioactive ray in the presence of a graft monomer, or (iv) a method in which the propylene polymer is contacted with oxygen or ozone in the presence of a graft monomer.

There is no particular limitation on the peroxide which is used in the preparation of the modified propylene polymer and appropriate peroxides can be selected freely.

For example, there can be used azo compounds such as 2,2'-azobisisobutyronitrile, 2,2'-azobis(2,4,4)-trimethylvaleronitrile, and various organic peroxides such as methyl ethyl ketone peroxide, cyclohexanone peroxide, 3,3,5-trimethylcyclohexanone peroxide, 2,2-bis(t-butylperoxy)butane, t-bytyl hydroperoxide, cumene hydroperoxide, diisopropylbenzene hydroperoxide, 2,5-dimethylhexane 2,5-dihydroperoxide, di-t-butyl peroxide, 1,3-bis(t-butylperoxyisopropyl)benzene, 2,5-dimethyl 2,5-di(t-butylperoxy)hexane, 2,5-dimethyl 2,5-di(t-butylperoxy)hexyne-3, lauroyl peroxide, 3,3,5-trimethylhexanoyl peroxide, benzoyl peroxide, t-butyl peracetate, t-butyl peroxyisobutyrate, t-butyloxy pivalate, t-butyloxy-2-ethylhexanoate, t-butyl peroxy-3,5,5-trimethylhexanoate, t-butyl peroxylaurate, t-butyl peroxybenzoate, di-t-butyl peroxyisophthalate, 2,5-dimethyl 2,5-di(benzoyl peroxy)hexane, t-butyl peroxymaleate, t-butyl peroxyisopropylcarbonate, and polystyrene peroxide.

The alkenyl aromatic monomer-grafted modified propylene polymer used as the component (b) in this invention is a resin composition comprising 100 parts by weight of the propylene polymer and 0.2 to 150 parts by weights, preferably 2 to 100 parts by weight, of an alkenyl aromatic monomer graft copolymerized thereto.

When the amount of the alkenyl aromatic monomer to be graft copolymerized is below 0.2 part by weight, no modification effect is observed while with that exceeding 100 parts by weight the chemical resistance of the product decreases.

In the resin composition of this invention, the component (c), which may be used if desired, is a rubbery substance. The "rubbery substance" used herein refers to natural or synthetic polymer materials which are elastic at room temperature. Specific examples thereof include natural rubber, butadiene polymers, butadiene-styrene copolymers (all the types of copolymers inclusive of random copolymers, block copolymers, graft copolymers, etc.) or their hydrogenated products, isoprene polymers, chlorobutadiene polymers, butadiene-acrylonitrile copolymers, isobutylene polymers, isobutylene-butadiene copolymers, isobutylene-isoprene copolymers, ethylene-acrylic acid copolymers, ethylene-propylene copolymers, ethylene-butene copolymers, ethylene-propylene-styrene copolymers, styrene-isoprene copolymers, or their hydrogenated products, styrene-butylene copolymers, styrene-ethylene-propylene copolymers, perfluoro rubber, fluorine rubber, chloroprene rubber, butyl rubber, silicone rubber, ethylene-propylene-nonconjugated diene copolymers, thiokol rubber, polysulfide rubber, polyurethane rubber, polyether rubber (e.g., polypropylene oxide, etc.), epichlorohydrin rubber, polyester elastomer, polyamide elastomer, epoxy group-containing copolymers, etc.

The "epoxy group-containing copolymers" used herein refers to copolymers composed of an unsaturated epoxy compound and an ethylenically unsaturated compound.

Although no particular limitation is posed on the proportion of the unsaturated epoxy compound and the ethylenically unsaturated compound contained in the epoxy group-containing copolymer, usually it is preferred that 0.1 to 50% by weight, preferably 1 to 30% by weight, of the unsaturated epoxy compound be copolymerized.

As for the unsaturated epoxy compound, there can be used compounds which contain in the molecule both an unsaturated group capable of copolymerizing with an ethylenically unsaturated compound, and an epoxy group.

For example, unsaturated glycidyl esters represented by the general formula (4) and unsaturated glycidyl ethers represented by the general formula (5) below can be used.

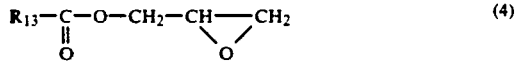
(4)

wherein $R_{13}$ represents a hydrocarbyl group having 2 to 18 carbon atoms and containing an ethylenically unsaturated bond.

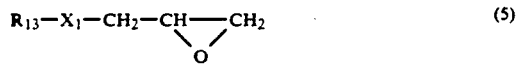
(5)

wherein $R_{13}$ represents a hydrocarbyl group having 2 to 18 carbon atoms and containing an ethylenically unsaturated bond, and $X_1$ represents

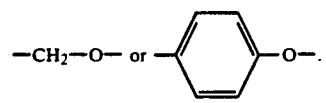

Specific examples thereof include glycidyl esters such as glycidyl acrylate, glycidyl methacrylate and glycidyl itaconate, glycidyl ethers such as allyl glycidyl ether, 2-methylallyl glycidyl ether, styrene p-glycidyl ether, etc.

The ethylenically unsaturated compound includes olefins, vinyl esters of saturated carboxylic acids having 2 to 6 carbon atoms, esters of acrylic or methacrylic acid with a saturated alcohol having 1 to 8 carbon atoms, maleic acid esters, methacrylic acid esters, fumaric acid esters, vinyl halides, styrenes, nitriles, vinyl ethers, acrylamides, etc.

Specific examples include ethylene, propylene, butene-1, vinyl acetate, methyl acrylate, ethyl acrylate, methyl methacrylate, dimethyl maleate, diethyl fumarate, vinyl chloride, vinylidene chloride, styrene, acrylonitrile, isobutyl vinyl ether and acrylamide. Of these, ethylene is particularly preferred. Furthermore, in order to improve the impact resistance at low temperatures of the resin composition by decreasing the glass transistion point, it is preferred to use ethylene as a second component and copolymerize therewith vinyl acetate and/or methyl acrylate as a third component.

As for the rubbery substance used as the component (c) in this invention, there can be used any products regardless of the type of production methods (e.g., emulsion polymerization methods, solution polymerization methods, etc.), and the type of catalysts used (e.g., peroxides, trialkylaluminiums, lithium halides, nickel based catalysts, etc.).

Furthermore, various types of products having different degrees of crosslinking, different proportions of microstructures (e.g., cis-structure, trans-structure, vinyl groups, etc.), or different mean rubber particle sizes can also be used.

In addition, various polymer rubbers such as copolymer rubbers including random copolymers, block copolymers, graft copolymers, etc. can be used as the rubbery substance in this invention. Modified products of these copolymers can also be used as the rubbery substance.

As for the modified copolymer rubber, there can be used, for example, those copolymers modified with one or more of styrene, unsaturated dicarboxylic acids or their anhydrides, glycidyl acrylate or methacrylate, and carboxylic acid-containing compounds.

In this invention, one or more of the above-described rubbery substances inclusive of their modified products can be selected and used.

Examples of the ethylene-α-olefin copolymer rubber which can be used as the component (c) in the resin composition of this invention include copolymer rubbers of ethylene and another α-olefin such as propylene, butene-1, pentene-1, hexene-1, 4-methylpentene-1 and octene-1, or ternary copolymer rubbers such as ethylene-propylene-butene-1 copolymer. Of these, ethylene-propylene copolymer rubber and ethylene-butene-1 copolymer rubber are preferred.

The ethylene content of the ethylene-α-olefin copolymer rubber is 15 to 85% by weight, preferably 40 to 80% by weight. The highly crystalline copolymer having an ethylene content of more than 85% by weight is difficult to process under ordinary rubber molding conditions while that having an ethylene content of less than 15% by weight tends to suffer increase in glass transition point (Tg), resulting in the deterioration of rubbery properties, which is not desirable. It is preferred that the ethylene-α-olefin copolymer rubber has a glass transition point of not higher than −10° C.

Also, it is possible to use ethylene-α-olefin-nonconjugated diene copolymer rubber as the component (c). In this case, however, the content of the nonconjugated diene needs to be not higher than 20% by weight. When it exceeds 20% by weight, it is disadvantageous in that the flowability of the composition is aggravated due to gelation which will occur upon kneading.

As for the nonconjugated diene used herein, preferred are ethylidene norbornene, dicyclopentadiene, 1,4-hexadiene, etc.

It is preferred that the number average molecular weight of the copolymer rubber is in the range of 10,000 to 100,000, in which the copolymer rubber is kneadable in extruders. With too small a molecular weight, the operation of the copolymer rubber upon supplying to the extruder will become difficult, and on the contrary, too large a molecular weight will decrease the flowability of the rubber, resulting in that it is difficult to process it. The Mooney viscosity ($ML_{1+4}$, 121° C.) of the copolymer rubber is preferably 5 to 120.

Although the molecular weight distribution of the copolymer rubber is not limited particularly, it ranges such that Q value (i.e., weight average molecular weight/number average molecular weight) is preferably 1 to 30, and more preferably 2 to 20.

Examples of the starting material for preparing the modified ethylene-$\alpha$-olefin copolymer which is modified with unsaturated dicarboxylic acids or their anhydrides by graft addition include maleic anhydride, maleic acid, fumaric anhydride, citraconic anhydride, etc.

The unsaturated dicarboxylic acid or its anhydride-modified ethylene-$\alpha$-olefin copolymer rubber can be prepared by known methods. To take an example of using maleic anhydride as a modifying agent, the preparation method is explained below. That is, maleic anhydride and a free radical initiator together with an ethylene-$\alpha$-olefin copolymer rubber are added to a hydrocarbon solvent and allowed to react at 60° to 150° C. for several minutes to several hours to obtain a solution containing a modified rubber. In this case, alcohols, amines, etc. may be added to convert maleic anhydride to its half ester or half amide, if desired. The solution thus obtained may be poured into a large amount of methanol, acetone, etc. to recover the modified rubber.

Alternatively, the modified copolymer rubber can be prepared by kneading maleic anhydride and a free radical initiator together with an ethylene-$\alpha$-olefin copolymer rubber in an extruder. For example, 0.5 to 15 parts by weight of maleic anhydride per 100 parts by weight of the rubber and 0.005 to 1.0 part by weight of the free radical initiator per 100 parts by weight of the rubber are kneaded together with the rubber at 150° to 300° C. for several minutes to several tens minutes to obtain a modified copolymer rubber. If necessary or desired, gelation preventives, for example, phenol based antioxidants such as 2,6-di-t-butyl-hydroxytoluene (BHT) may be used in combination.

In this invention, various other types of modified rubbery substances may be used as the rubbery substance. For example, modified rubbery substances which are modified with monomer compounds selected from styrene, methyl acrylate, methyl methacrylate, allyl glycidyl ether, glycidyl methacrylate, glycidyl acrylate, etc. in addition to maleic anhydride referred to above. Furthermore, rubbery substances obtained by modifying the rubbery substance with two or more of the monomer compounds may be used. Also, two or more members selected from the rubbery substance and the modified rubbery substances described above may be used simultaneously.

The above-described styrene monomer-grafted ethylene-$\alpha$-olefin copolymer rubber can also be prepared by a method comprising dispersing in pure water minute chips or pellets of an ethylene-$\alpha$-olefin copolymer rubber together with a dispersing agent, impregnating the copolymer rubber with a styrene monomer, and reacting them at 50° to 150° C. for 1 to 5 hours using a free radical initiator.

As for the rubbery substance used herein, preferred are ethylene-$\alpha$-olefin copolymer rubber or its modified products, ethylene-$\alpha$-olefin-nonconjugated diene copolymer rubber or its modified products, styrene-butadiene random copolymer rubber, styrene-butadiene-styrene block copolymer rubber, hydrogenated styrene-butadiene block copolymer rubber, hydrogenated styrene-butadiene-styrene block copolymer rubber, etc.

The rubbery substance as the component (c) can be used in an amount of 1 to 50 parts by weight per 100 parts by weight of the sum of the components (a) and (b).

When the rubbery substance is contained in an amount of less than 1 part by weight, the improvement of impact resistance by the addition of the rubbery substance is poor. On the other hand, with the rubbery substance in an amount of exceeding 50 parts by weight, the excellent properties which polyphenylene ether has inherently are weakened, which is not desirable.

In the thermoplastic resin composition of this invention, other high molecular weight compounds may be added. Examples of the other high molecular weight compounds include polyolefins (exclusive of polypropylene) such as polymethylpentene; homopolymers and copolymers of various vinyl compounds such as polyvinyl chloride, polymethyl methacrylate, polyvinyl acetate, polyvinylpyridine, polyvinylcarbazole, polyacrylamide, polyacrylonitrile, ethylene-vinyl acetate copolymer, and alkenyl aromatic resins; polycarbonate, polysulfone, polyethylene terephthalate, polybutylene terephthalate, polyarylene esters (e.g., U polymer produced by Unitika Co.), polyphenylene sulfide; polyamides such as Nylon-6, Nylon-6,6, Nylon-12, etc.; condensed high molecular weight compounds such as polyacetals, etc. Furthermore, various thermosetting resins can be used, examples of which include silicone resins, fluorinated resins, polyimides, polyamideimides, phenol resins, alkyd resins, unsaturated polyester resins, epoxy resins, diallylphthalate resins, etc.

In practicing this invention, the thermoplastic resin composition may be kneaded together with a reinforcing agent such as glass fiber or carbon fiber, an inorganic or organic filler such as carbon black, silica or $TiO_2$, a plasticizer, a stabilizer, a flame retardant, a dye, a pigment, etc.

More particularly, the reinforcing agent is to increase mechanical and thermal properties such as bending strength, flexural modulus, tensile strength, modulus in tension, and heat distortion temperature when it is admixed. Examples thereof include alumina fiber, carbon fiber, glass fiber, high modulus polyamide fiber, high modulus polyester fiber, silicon carbide fiber, titanate whisker, etc.

As for the amount of the reinforcing agent, it is sufficient that the reinforcing agent is contained in amounts effective for reinforcing the thermoplastic resin composition and usually it is preferred to use about 5 to 100 parts by weight of the reinforcing agent per 100 parts by weight of the resin composition of this invention.

Particularly preferred reinforcing filler is glass, and it is preferred to use glass fiber filament composed of borosilicate glass containing a relatively small amount of sodium, which is made of gypsum and aluminium borosilicate. This glass is known as "Σ" glass. However, in the case where electric properties are not so important, other glass such as one known as "C" glass, which contains sodium in small amounts, is also useful. The glass fiber filament can be produced by conventional methods, for example, steam or air blowing, flame blowing, and mechanical drawing. Filaments suitable for reinforcing plastics can be produced by mechanical drawing. The diameter of the filament ranges from about 2 to 20 μm, which is not so strict in this invention.

In this invention, the length and form of the glass fiber filament are not limited particularly. The filaments may be stranded into multifilament fibers, which may then be stranded into threads, ropes or rovings. The filaments may also be woven to obtain mats. However, it is convenient to use glass filaments cut in the form of strands about 0.3 to about 3 cm, preferably about 0.6 cm or less, in length.

To be in detail on the flame retardant, those flame retardants useful in this invention include a group of compounds well known to one skilled in the art.

Generally, more important compounds in the known compounds are compounds containing elements capable of imparting flame retardance such as bromine, chlorine, antimony, phosphor and nitrogen. For example, there can be used halogenated organic compounds, antimony oxide, a mixture of antimony oxide and a halogenated organic compound, a mixture of antimony oxide and a phosphor compound, a phosphor element, a phosphor compound, a mixture of a phosphor compound or a compound containing a phosphor-nitrogen bond and a halogen-containing compound, and mixtures of two or more of these.

The amount of the flame retardant is not limited particularly and it is sufficient to use it in amounts effective for imparting flame retardancy. It is disadvantageous to use too much of it since the physical properties of the resulting composition is deteriorated, i.e., the softening point of the resin composition, for example, decreases. An appropriate amount of the flame retardant is 0.5 to 50 parts by weight, preferably 1 to 25 parts by weight, and more preferably 3 to 15 parts by weight, per 100 parts by weight of the polyphenylene ether (a) or a resin composition containing the polyphenylene ether (a).

Useful halogen-containing compounds include those represented by the general formula (6)

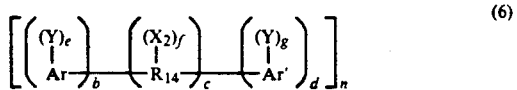

(6)

wherein n is an integer of 1 to 10, $R_{14}$ represents a member selected from the class consisting of an alkylene group, an alkylidene group or an alicyclic group (e.g., a methylene group, an ethylene group, a propylene group, an isopropylene group, an isopropylidene group, a butylene group, an isobutylene group, an amylene group, a cyclohexylene group, a cyclopentylidene group, etc.), an ether group, a carbonyl group, an amine group, a sulfur-containing group (e.g., sulfide group, sulfoxide group, sulfone group, etc.), a carbonate group, and a phosphor-containing group.

$R_{14}$ may be a group which is composed of two or more alkylene or alkylidene groups bonded to each other with a group such as an aromatic group, an amino group, an ether group, an ester group, a carbonyl group, a sulfide group, a sulfoxide group, a sulfone group, or a phosphor-containing group. Ar and Ar' each are a monocyclic or polycyclic carbocyclic aromatic residue such as a phenylene group, a biphenylene group, a terphenylene group, or naphthylene.

Ar and Ar' may be the same or different.

Y represents a substituent group selected from the class consisting of an organic group, an inorganic group or an organometallic group. The substituent groups represented by Y may be (1) e.g., halogen atoms such as chlorine, bromine, iodine or fluorine, (2) an ether group represented by the general formula OE wherein E is a monovalent hydrocarbyl group the same as those represented by $X_2$ below, (3)—OH group, (4) a monovalent hydrocarbyl group, or (5) other substituent groups such as a nitro group, or a cyano group. When e is 2 or more, Y's may be the same or different.

$X_2$ is a monovalent hydrocarbyl group such as an alkyl group, e.g., a methyl group, an ethyl group, a propyl group, an isopropyl group, a butyl group, a decyl group, etc., an aryl group, e.g., a phenyl group, a naphthyl group, a biphenyl group, a xylyl group, a tolyl group, etc., an aralkyl group, e.g., a benzyl group, an ethylphenyl group, etc., an alicyclic group, e.g., a cyclopentyl group, a cyclohexyl group, etc., or a monovalent hydrocarbyl group containing an inert substituent group therein. When two or more $X_2$'s are used they may be the same or different.

e is an integer of from 1 to a maximum number of hydrogen atoms on the aromatic ring Ar or Ar' which hydrogen atoms can be substituted. f is 0 or an integer of 1 to a maximum nunber of hydrogen atoms on R which hydrogen atoms can be substituted.

b, c and d are integers inclusive of 0. When c is not 0, neither b nor d is 0. Alternatively, only one of b and d may be 0. When c is 0, the aromatic groups are bonded to each other directly through a carbon-carbon bond. The hydroxy group or the substituent groups represented by Y on the aromatic residue Ar and Ar' may be present at any desired position(s) out of ortho-, meta- and para-positions on the aromatic ring.

Specific examples of the compound represented by the general formula (6) include the following compounds:

2,2-Bis(3,5-dichlorophenyl)propane,
Bis(2-chlorophenyl)methane,
1,2-Bis(2,6-dichlorophenyl)ethane,
1,1-Bis(4-iodophenyl)ethane,
1,1-Bis(2-chloro-4-iodophenyl)ethane,
1,1-Bis(2-chloro-4-methylphenyl)ethane,
1,1-Bis-(3,5-dichlorophenyl)ethane,
2,2-Bis(3-phenyl-4-bromophenyl)ethane,
2,3-Bis(4,6-dichloronaphthyl)propane,
2,2-Bis(2,6-dichlorophenyl)pentane,
2,2-Bis(3,5-dichlorophenyl)hexane,
Bis(4-chlorophenyl)phenylmethane,
Bis(3,5-dichlorophenyl)cyclohexylmethane,
Bis(3-nitro-4-bromophenyl)methane,
Bis(4-hydroxy-2,6-dichloro-3-methoxyphenyl)methane,
2,2-Bis(3,5-dibromo-4-hydroxyphenyl)propane,
2,2-Bis(3,5-dichloro-4-hydroxyphenyl)propane, and
2,2-Bis(3-bromo-4-hydroxyphenyl)propane.

In addition, there can be used those bis-aromatic compounds which contain a sulfide group, a sulfoxy group, etc. in place of the two aliphatic groups contained in the above-described specific examples, for example, tetrabromobenzene, hexachlorobenzene, hexabromobenzene, 2,2'-dichlorobiphenyl, 2,4'-dibromobiphenyl, 2,4'-dichlorobiphenyl, hexabromobiphenyl, octabromobiphenyl, decabromobiphenyl, halogenated diphenyl ether containing 2 to 10 halogen atoms, oligomers composed of 2,2-bis(3,5-dibromo-4-hydroxyphenyl)-propane and phosgene and having a degree of polymerization of 1 to 20, etc.

The halogen compound which is preferable as a flame retardant in this invention includes aromatic halogenated compounds such as chlorinated benzene, brominated benzene, chlorinated biphenyl, chlorinated terphenyl, brominated biphenyl, and brominated terphenyl, compounds containing two phenyl nuclei separated by an intervening divalent alkylene group and also containing at least two chlorine or bromine atoms per one phenyl nucleus, and mixtures of two or more of the above-described compounds. Particularly preferred are hexabromobenzene, chlorinated biphenyl or terphenyl, and mixtures thereof with antimony oxide.

Representative phosphoric compounds which are suitably used as a flame retardant in this invention include compounds represented by the general formula (7) and nitrogen-containing similar compounds.

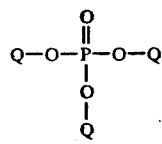

(7)

wherein Q's, which may be the same or different, each represent a hydrocarbyl group such as an alkyl group, a cycloalkyl group, an aryl group, an alkyl-substituted aryl group and an aryl-substituted alkyl group; a halogen atom; a hydrogen atom; or a combination of these. Suitable examples of the phosphoric acid esters include phenyl bisdodecyl phosphate, phenyl bisneopentyl phosphate, phenyl ethylene hydrogen phosphate, phenyl bis(3,5,5'-trimethylhexyl) phosphate, ethyl diphenyl phosphate, 2-ethylhexyl di(p-tolyl) phosphate, diphenyl hydrogen phosphate, bis(2-ethylhexyl) p-tolyl phosphate, tritolyl phosphate, bis(2-ethylhexyl) phenyl phosphate, tri(nonylphenyl) phosphate, phenyl methyl hydrogen phosphate, di(dodecyl) p-tolyl phosphate, triphenyl phosphate, halogenated triphenyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, and diphenyl hydrogen phosphate. The most preferred phosphoric acid ester is triphenyl phosphate. It is also preferred to use triphenyl phosphate together with hexabromobenzene, or triphenyl phosphate together with antimony oxide.

Other flame retardant which can be used in this invention includes compounds containing a phosphor-nitrogen bond such as phosphorus nitride chloride, phosphoric ester amide, phosphoric acid amide, phosphinic acid amide, tris(aziridinyl) phosphine oxide or tetrakis(hydroxymethyl) phosphonium chloride, etc.

There is no particular limitation on the methods of preparing the resin composition of this invention, and ordinary known methods can be used for the purpose. For example, it is effective to mix the components in the form of solutions and then evaporate the solvent or precipitate the resin in a non-solvent. On an industrial scale, however, practical method for the production uses kneading the components in a melted state. For melt-kneading, there can be used a kneading apparatus such as mono-axial or bi-axial extruder generally used, or various types of kneaders. High speed bi-axial extruders are particularly preferred.

Upon kneading, it is preferred to homogeneously mix the respective resin components in the form of powder or pellet in a tumbler, a Henschel mixer or a like apparatus. However, mixing may be omitted, if desired, and they are metered and fed separately to the kneading apparatus.

The kneaded resin composition can be molded by injection molding, extrusion molding or various other molding methods. This invention, however, includes methods in which the resin components are dry blended upon injection molding or extrusion molding and directly kneaded during melt-processing operation to obtain molded articles.

In this invention, there is no particular limitation on the order of kneading. For example, (a) the polyphenylene ether or polyphenylene ether-containing composition, (b) the propylene polymer or propylene polymer composition, and (c) the rubbery substance may be kneaded in a lump, or the components (a) and (b) may be kneaded previously followed by kneading the rubbery substance (c). Other kneading orders may also be used.

The resin composition of this invention can be molded into various articles such as sheets, tubes, films, fibers, laminated articles, coating materials by injection molding, extrusion molding or a like method. In particular, it can be used as interior or exterior fitting materials for automobile parts such as bumpers, instrument panels, fenders, trimms, door panels, wheel covers, side protectors, garnish, trunk lids, vonnets, roof, etc. It can also be used in machine parts which must be heat resistant. In addition, it can be used for bicycle parts such as covering material, muffler cover, leg shield, etc. Furthermore, the resin composition of this invention can be used for electric and electronic parts which need to have high strength and heat resistance such as housing, chasis, connectors, printed substrates, pulleys, etc.

EXAMPLES

Hereinafter, this invention will be explained in greater detail with reference to examples which should not be construed as limiting this invention. Tests for deflection temperature under load or heat distortion temperature (H. D. T.), Izod impact strength (thickness: 3.2 mm) were performed according to JIS K7207 and JIS K7110, respectively. Flexural modulus was determined according to ASTM D790-66 using samples of 5.0 mm thick press molded according to JIS K6758.

EXAMPLES 1-17

The polyphenylene ether, propylene polymer, styrene-grafted propylene polymer and styrene-grafted ethylenepropylene copolymer rubber were prepared as follows.

Component (a): Polyphenylene Ether

In a 10 liter (l) autoclave with a jacket and equipped with a stirrer, a thermometer, a condenser and an air inlet pipe reaching the bottom of the autoclave were charged 3,420 g of xylene, 1,366 g of methanol and 1,222 g (10 mols) of 2,6-dimethylphenol and 24 g (0.6 mol) of sodium hydroxide to obtain a homogeneous solution, to which was added a solution of 100 g of methanol having dissolved therein 31.5 g (0.3 mol) of diethanolamine, 19.4 g of (0.15 mol) of di-n-butylamine and 0.99 g (0.005 mol) of manganese chloride tetrahydrate. Then, air was blown into the autoclave at a rate of 5 l/min. while the contents were stirred vigorously.

The reaction temperature and pressure were maintained at 35° C. and 9 kg/cm², respectively. Supply of air was stopped after 7 hours from the initiation of the air blowing, and the reaction mixture was poured into a mixture of 66 g (1.15 mols) of acetic acid and 4,900 g of methanol. The resulting slurry was filtered under reduced pressure to isolate polyphenylene ether in a wet state. The polyphenylene ether thus isolated was washed with 7,200 g of methanol and then dried at 150° C. under reduced pressure overnight to obtain 1,179 g of polyphenylene ether in a dry state. This had a reduced viscosity of 0 54 dl/g measured at 25° C. in 0.5 g/dl of chloroform. The polyphenylene ether thus obtained is named "A" for brevity.

Component (b): Styrene-Grafted Propylene Polymer

In a 10 l autoclave was charged pellets (1 kg) of a propylene-ethylene block copolymer having a melt index of 3.0 g/10 min. and an ethylene content of 7% by weight (trade name: SUMITOMO NOBLEN, produced by Sumitomo Chemical Co., Ltd.), hereinafter called "B-1" for brevity, together with 4 l of water, 200 g of styrene monomer, 6 g of a dispersing agent (METHOLOSE 90SH-100; trade name) and a peroxide (PERBUTYL PV; trade name), and allowed to react at 120° C. for about 1 hour while blowing into nitrogen gas. After cooling, the reaction mixture was extracted with methyl ethyl ketone to remove polystyrene and thus styrene-grafted propylene polymer was recovered. The amount of styrene which was grafted to propylene polymer was 176 g. The styrene-grafted product thus obtained is called "B-2" for brevity.

Component (c): Styrene-Grafted Ethylene-Propylene Rubber

In a stainless steel autoclave equipped with a stirrer were charged 100 parts by weight of ESPRENE E-201 (trade name for a product by SUMITOMO CHEMICAL CO., LTD.; EPM, $ML_{1+4}121°$ C.=27, ethylene content=47% by weight, Tg=$-64°$ C.; hereinafter, this rubber is called "C-1" for brevity) as an ethylene-α-olefin copolymer rubber in the form of chips, 350 parts by weight of pure water, 4.0 parts by weight of calcium tertiary phosphate and 4.0 parts by weight of PLURONIC F (trade name for a product by ASAHI DENKA CO., LTD.) and stirred with sufficient flow of nitrogen gas.

Thereafter, 30 parts by weight of styrene monomer and 0.75 part by weight of SUNPEROX TO (trade name for a product by SANKEN KAKOU CO., LTD.) as a free radical initiator were added to the resulting reaction mixture. After elevating the temperature to 110° C. in 80 minutes, the reaction was continued for 1 hour. After cooling, styrene-grafted copolymer was taken out by filtration and washed sufficiently with pure water followed by drying under vacuum. Infrared absorption spectrum analysis indicated that the styrene content of the styrene-grafted product was 25% by weight. Furthermore, the product had $ML_{1+4}121°$ C. of 53 and Tg of $-58°$ C. Hereinafter, this rubber is called "C-2" for brevity.

EXAMPLES 1-7

The above-described polyphenylene ether, propylene polymer, etc. were kneaded in proportions shown in Table 1 hereinbelow at a kneading temperature of 270° C. using LABO PLASTOMILL (produced by TOYO SEIKI CO., LTD.). The resulting composition was compression-molded to form test pieces, which were then measured for their physical properties.

The results of the tests for Izod impact strength, deflection temperature under load (HDT) and flexural modulus on each of the test pieces or samples are shown in Table 1 below. As will be clear from Examples 1 to 4, the HDT values and flexural modulus values of polyphenylene ether and the composition composed of polypropylene and EPR rubber were low in contrast to the composition containing the styrene-grafted propylene polymer of this invention which showed improved Izod impact strength, HDT and flexural modulus. Remarkable improvement in the physical properties was observed particularly in the case where styrene-grafted ethylene-propylene rubber was blended.

From Example 4, it can be seen that the composition which had not been blended with the rubbery substance showed very low Izod impact strength.

EXAMPLES 8 to 13

Various rubbery substances were blended with polypheneylene ether and styrene-grafted polypropylene in proportions shown in Table 2 hereinbelow. The resulting compositions were melt-kneaded using LABO PLASTOMILL and the products were measured for their physical properties in the same manner as in Examples 1-7. The results obtained are shown in Table 2.

EXAMPLES 14-17

Component (b): Styrene-grafted homo-polypropylene

In a 10 l autoclave was charged pellets (1 kg) of homo-polypropylene having a melt index of 1.0 g/10 min., a crystallization temperature of 121° C. and a flexural modulus of 14,700 kg/cm² (hereinafter called "B-3" for brevity), together with 4 l of water, 350 g of styrene monomer, 6 g of a dispersing agent (METHOLOSE 90SH-100; trade name) and a peroxide (PERBUTYL PV; trade name), and allowed to react at 120° C. for about 1 hour while blowing of nitrogen gas. After cooling, the reaction mixture was extracted with methyl ethyl ketone to remove polystyrene and thus styrene-grafted propylene polymer was recovered. The amount of styrene which was grafted to propylene polymer was 193 g. The degree of graft polymerization of the styrene-grafted product thus obtained, which was called "B-4" for brevity, was 55%.

The composition and physical properties of various polymer blends containing the propylene polymer (B-4), etc. are shown in Table 3 hereinbelow.

From the results shown in Table 3, it can be seen that those compositions blended with the styrene-grafted propylene polymer are superior to those blended with the homo-polypropylene (no styrene-graft) in particularly their HDT and flexural modulus.

EXAMPLES 18-36

The polyphenylene ether, crystalline propylene polymer composition, styrene-grafted crystalline propylene polymer composition and styrene-grafted ethylene-propylene copolymer rubber were prepared as follows.

Component (a)

The same polyphenylene ether as used in Examples 1 to 17 above was employed.

Component (b): Crystalline Propylene Polymer

(1) Synthesis of Vinylcyclohexane-Propylene Copolymer

To 100 ml of dehydrated pure n-heptane was added 1.95 g of triethyl aluminium, 675 mg of ethyl p-anisate and 6.0 g of titanium compound catalyst prepared according to Example 1 of Published Unexamined Japanese Patent Application No. 57-59916 in this order, and the temperature of the mixture was elevated to 50° C. Subsequently, 50 g of vinylcyclohexane was added to the mixture and polymerization of vinylcyclohexane was continued for 15 minutes. The resulting polymer slurry was washed with 200 ml of n-heptane four times to remove unused vinylcyclohexane, triethylaluminium as a cocatalyst and ethyl p-anisate. Then, n-heptane was removed from the washed active slurry by distillation under reduced pressure to obtain 7.8 g of powder of polyvinylcyclohexane containing active catalyst. The amount of polyvinylcyclohexane polymerized is 0.30 g per g of the charged titanium compound catalyst.

In a stainless steel autoclave (inner volume: 5 l) was performed polymerization of propylene using 1.06 g of the above-described vinylcyclohexane polymerization catalyst, 0.75 g of triethyl aluminium, 0.237 g of methyl p-toluylate and 1,500 ml of n-heptane under the conditions of a pressure of 6 kg/cm² gauge and a temperature of 70° C. and a hydrogen concentration of 1.5% by volume for 40 minute. After completion of the polymerization, 50 ml of n-butanol was added to stop the polymerization and the resulting polymer slurry was taken out followed by the separation of polymer powder and solvent by filtration. After washing the polymer powder with 500 ml of 1N hydrochloric acid, further washing was performed with methanol until the washings became neutral.

After drying, the powder weighed 840 g. The amount of propylene polymerized was 1030 g per g of the titanium compound catalyst. Its [η] was 1.93 dl/g. The content of vinylcyclohexane in the copolymer powder thus obtained was 290 ppm by weight calculating from the amount of polymerized polymer per unit weight of the titanium compound catalyst used. Hereinafter, this copolymer is called "VCP" for brevity.

(2) Crystalline Propylene Polymer

To 100 parts by weight of the homo-polypropylene (B-3) described above which had a crystallization temperature of 121° C., a flexural modulus of 14,700 kg/cm² and a melt index of 1.0 were added 0.5 part by weight of the copolymer obtained in (1) above, 0.2 part by weight of BHT as a stabilizing agent, 0.05 part by weight of calcium stearate, and 0.05 part by weight of Irganox 1010 (trade name). After well mixing it with a Henschel mixer, the mixture was molded into pellets by a conventional method using a 40 mmφ extruder.

The thus obtained crystalline propylene polymer composition, upon measurement for its crystallization temperature with a differential scanning calorimeter (DSC) at a temperature decrease rate of 4° C./min., showed 127° C. and its flexural modulus was 17,500 kg/cm². This polymer composition is called "B-5" for brevity.

(3) Styrene-Grafted Crystalline Propylene Polymer

In a 10 l autoclave was charged pellets (1 kg) of crystalline polypropylene obtained in (2) above, together with 4 l of water, 300 g of syrene monomer, 6 g of a dispersing agent (METHOLOSE 90SH-100; trade name) and a peroxide (PERBUTYL PV; trade name), and allowed to react at 120° C. for about 1 hour while blowing of nitrogen gas. After cooling, the reaction mixture was extracted with methyl ethyl ketone to remove polystyrene and thus styrene-grafted crystalline propylene polymer was recovered. The amount of styrene which was grafted to propylene polymer was 176 g. The degree of graft polymerization of the styrene-grafted product thus obtained was 58. This polymer is called "B-6" for brevity, A homo-poplypropylene was recovered by the same procedures as above using 1 kg of the above-described homo-polypropylene (B-3) having a melt index of 1.0 g/min., a crystallization temperature of 121° C. and a flexural modulus of 14,700 kg/cm². The amount of styrene which was grafted to the homo-polypropylene was 173 g and the degree of graft polymerization was 57%.

The degree of graft polymerization was obtained according to the following equation.

$$\text{Degree of Graft Polymerization (\%)} = \frac{W_1 - W_2}{W_2} \times 100$$

wherein $W_1$ indicates the weight of the graft polymer and $W_2$ indicates the weight of the charged propylene polymer.

This styrene-grafted polypropylene is called "B-7" for brevity.

EXAMPLES 18-22

Polyphenylene ether, crystalline propylene polymer composition, etc. in proportions shown in Table 4 hereinbelow were kneaded and molded in the same manner as in Examples 1-17, and the physical properties of the molded articles were measured.

The results on Izod impact strength, HDT and flexural modulus are shown in Table 4.

As will be clear from Table 4, the compositions comprising polyphenylene ether and homo-polypropylene had low HDT and low flexural modulus. On the contrary, it was observed that the compositions comprising the propylene polymer having high crystallinity had extremely high improvement in their HDT and flexural modulus.

Furthermore, it was observed that the impact strength of the resins was improved by blending the rubbery substance with polyphenylene ether and propylene polymer.

EXAMPLES 23-28

Polyphenylene ether and styrene-grafted products of crystalline propylene polymer composition, etc. were melt-kneaded in LABO PLASTOMILL in the same manner as in Examples 1-17, and their physical properties were measured.

The proportions of the components of the resins and the results on their physical properties are shown in Table 5.

As will be clear from Table 5, the compositions comprising polyphenylene ether and styrene-grafted products of homo-propylene polymer had low HDT and low flexural modulus. On the contrary, it was observed that the compositions comprising polyphenylene ether and the styrene-grafted product of the crystalline propylene polymer had extremely high improvement in their HDT and flexural modulus.

Furthermore, from Example 27 it can be seen that the Izod impact strength, HDT and flexural modulus of the resins comprising styrene-grafted ethylene-propylene copolymer rubber as the rubbery substance had much more improved Izod impact strength, HDT and flexural modulus than those containing non-styrene-grafted ethylene-propylene copolymer rubber as the rubbery substance.

EXAMPLES 29–36

Polyphenylene ether was blended with crystalline propylene polymer, etc. and the physical properties of the product were measured. Results obtained are shown in Tables 6 and 7 together with the results obtained by measuring the physical properties of blends composed of polyphenylene ether and homo-polypropylene or other resin.

The compositions obtained containing blended therewith crystalline propylene polymer composition or its styrene-grafted product showed extremely higher HDT and flexural modulus than the compositions having blended therewith homo-polypropylene or its styrene-grafted product.

EXAMPLES 37–46

The polyphenylene ether, highly crystalline polypropylene and styrene-grafted highly crystalline polypropylene were obtained in the following procedures.

Component (a)

The same polyphenylene ether as used in Examples 1–17 was employed.

Component (b)

(1) Highly Crystalline Polypropylene

Highly crystalline propylene homopolymer was used which was prepared according to the slurry polymerization method described in Published Unexamined Japanese Patent Application No. 60-228504 and which had an inherent viscosity (measured in tetralin, 135° C.) of 2.42 dl/g, a melt flow rate of 1.6 g/10 min., a content of 20° C.-cold xylene-soluble portion of 0.6% by weight, and a content of boiling heptane-insoluble isotactic pentad fraction of 0.980. This polymer is called "B-8" for brevity.

Then, 100 parts by weight of this polypropylene was blended with a predetermined amount of the above-described VCP copolymer (nucleating agent), 0.2 part by weight of BHT as a stabilizing agent, 0.05 part by weight of calcium stearate, and 0.05 part by weight of Irganox 1010 (trade name). After mixing the mixture with a Henschel mixer, the composition was molded into pellets using a 40 mm$\phi$ extruder in a conventional manner.

Further, compositions containing VCP copolymer in amounts of 0.001 part by weight, 0.05 part by weight and 0.2 part by weight, respectively were obtained. They are called "B-9", "B-10" and "B-11", respectively.

(2) Styrene-Grafted Highly Crystalline Polypropylene

Pellets (1 kg) of the highly crystalline polypropylene (B-8) or highly crystalline polypropylene blended with a nucleating agent was charged in a 10 l autoclave together with 4 l of water, 350 g of styrene monomer, 6 g of a dispersing agent (METHOLOSE 90SH 100, trade name) and a peroxide (PERBUTYL PV, trade name), and allowed to react at 120° C. for about 1 hour with blowing nitrogen gas. After washing, polystyrene was extracted with methyl ethyl ketone and separated to recover styrene-grafted highly crystalline polypropylene composition.

The amount of styrene grafted to the highly crystalline polypropylene was 191 g. This styrene-grafted highly crystalline polypropylene is called "B-12" for brevity.

Also, the amount of styrene grafted to the highly crystalline polypropylene (B-11) obtained by blending 0.2 part by weight nucleating agent per 100 parts by weight of the highly crystalline polypropylene (B-8) was 182 g. This styrene-grafted highly crystalline polypropylene is called "B-13" for brevity.

(3) Polypropylene and Styrene-Grafted Polypropylene

The polypropylene used in Examples 39, 45 and 46 were as follows.

That is, highly crystalline propylene homopolymer was used which was prepared according to the slurry polymerization method described in Published Unexamined Japanese Patent Application No. 60-28405 and which had a melt flow rate of 1.3 g/10 min., an inherent viscosity (measured in tetralin, 135° C.) of 2.45 dl/g, a content of 20° C.-cold xylene-soluble portion of 2.9% by weight, a content of boiling heptane-soluble portion of 6.7% by weight and a content of boiling heptane-insoluble isotactic pentad fraction of 0.952. This polymer is called "B-14" for brevity.

Then, 100 parts by weight of this polypropylene was blended with a predetermined amount of the above-described VCP copolymer (nucleating agent), 0.2 part by weight of BHT as a stabilizing agent, 0.05 part by weight of calcium stearate, and 0.05 part by weight of Irganox 1010 (trade name). After mixing the mixture with a Henschel mixer, the composition was molded into pellets using a 40 mm$\phi$ extruder in a conventional manner. This polypropylene composition is called "B-15" for brevity.

EXAMPLES 37–39

Polyphenylene ether and highly crystalline polypropylene or other resin in proportions shown in Table 8 were kneaded using LABO PLASTOMILL (produced by TOYO SEIKI CO., LTD.) at a kneading temperature of 270° C. The composition thus obtained was compression molded into test pieces and their HDT flexural modulus were measured.

The physical properties of the thus obtained thermoplastic resin compositions are shown in Table 8. It was observed that the HDT and flexural modulus were much more improved when highly crystalline polypropylene was blended than when homo-polypropylene was blended. Even further improvement in these physical properties was observed when the styrene-grafted highly crystalline polypropylene.

EXAMPLES 40–46

Proportions and physical properties of various compositions obtained by blending polyphenylene either with a highly crystalline polypropylene, a blend of it with a nucleating agent, and a styrene-grafted highly crystalline polypropylene or other resin together with a rubbery substance are shown in Table 9. Improvement in HDT and flexural modulus was observed when the highly crystalline polypropylene was blended as compared to the case where homo-polypropylene was blended. This effect was more marked when the highly crystalline polypropylene blended with the nucleating agent was used. When the styrene-grafted product of the highly crystalline polypropylene blended with the nucleating agent was used not only the HDT and flexural modulus was improved even further but also improvement in the Izod impact strength was noted.

EFFECT OF THE INVENTION in that they have not only good moldability but also they can give rise to molded articles whose physical properties are well balanced.

Novel resin compositions provided by this invention can be processed with ease by conventional molding methods employed for ordinary polyphenylene ether based thermoplastic resins, for example, injection molding, extrusion molding, and provide products not only having well balanced physical properties such as impact strength, heat resistance and hardness but also having excellent homogeneity and smoothness in appearance.

TABLE 1

| | Resin composition (wt %) | | | | | Physical properties | | |
|---|---|---|---|---|---|---|---|---|
| | Polyphenylene ether (A) | Styrene-grafted propylene polymer (B-2) | Polypropylene[*1] (B-1) | EPR[*2] (C-1) | Styrene-modified EPR (C-2) | Izod impact notched (kg · cm/cm) | Heat distortion temperature (4.6 kg/cm$^2$, °C.) | Modulus of flexural elasticity (kg/cm$^2$) |
| Example 1 | 48 | 48 | 0 | 4 | 0 | 10 | 153 | 16,300 |
| Example 2 | 48 | 0 | 48 | 4 | 0 | 4 | 136 | 13,800 |
| Example 3 | 48 | 48 | 0 | 0 | 4 | 13 | 155 | 17,100 |
| Example 4 | 50 | 50 | 0 | 0 | 0 | 2 | 157 | 17,300 |
| Example 5 | 45 | 45 | 0 | 10 | 0 | 16 | 146 | 15,400 |
| Example 6 | 45 | 0 | 45 | 10 | 0 | 6 | 128 | 12,900 |
| Example 7 | 45 | 45 | 0 | 0 | 10 | 21 | 152 | 17,100 |

[*1] Sumitomo Noblen AH561 (Trade name, produced by Sumitomo Chemical Co., Ltd.)
[*2] Sumitomo Esprene E201 (Trade name, produced by Sumitomo Chemical Co., Ltd.; $ML_{1-4}$ 121° C. = 27)

TABLE 2

| | Resin composition (wt %) | | | Physical properties | | |
|---|---|---|---|---|---|---|
| | Polyphenylene ether (A) | Styrene-grafted propylene polymer (B-2) | Rubbery substance | Izod impact notched (kg · cm/cm) | Heat distortion temperature (4.6 kg/cm$^2$, °C.) | Modulus of flexural elasticity (kg/cm$^2$) |
| Example 8 | 42 | 42 | EPR (C-1)[*1] 16 | 17 | 140 | 14,300 |
| Example 9 | 42 | 42 | Styrene-modified EPR (C-2) 16 | 22 | 143 | 15,100 |
| Example 10 | 42 | 42 | SBR[*2] 16 | 8 | 131 | 13,100 |
| Example 11 | 42 | 42 | EPR[*3] 16 | 10 | 138 | 14,100 |
| Example 12 | 42 | 42 | Polybutadiene[*4] 16 | 9 | 128 | 12,700 |
| Example 13 | 42 | 42 | SEP[*5] 16 | 29 | 121 | 11,800 |

[*1] Sumitomo Esprene E201 (Trade name, produced by Sumitomo Chemical Co., Ltd.; $ML_{1-4}$ 121° C. = 27)
[*2] Sumitomo SBR 1507 (Trade name, produced by Sumitomo Chemical Co., Ltd.)
[*3] Etylene-propylene copolymer rubber ($ML_{1-4}$ 121° C. = 123)
[*4] Diene 35A (Trade name, produced by Asahikasei Co., Ltd.)
[*5] KRATON GX1701 [Trade name, produced by Shell Chemical Co., Ltd.; styrene-ethylene-propylene copolymer (styrene content 35 wt %)]

TABLE 3

| | Resin composition (parts by weight) | | | | Physical properties | | |
|---|---|---|---|---|---|---|---|
| | Polyphenylene ether (A) | Styrene-grafted propylene polymer (B-4) | Homo-polypropylene (B-3) | Espren E201 (C-1) | Izod impact notched (kg · cm/cm) | Heat distortion temperature (4.6 kg/cm$^2$, °C.) | Modulus of flexural elasticity (kg/cm$^2$) |
| Example 14 | 50 | 50 | 0 | 0 | 4.3 | 168 | 18,900 |
| Example 15 | 50 | 50 | 0 | 10 | 12.9 | 154 | 15,100 |
| Example 16 | 50 | 0 | 50 | 0 | 3.1 | 152 | 16,300 |
| Example 17 | 50 | 0 | 50 | 10 | 9.7 | 142 | 12,900 |

As described hereinabove, the thermoplastic resin compositions of this invention exhibit excellent effects

TABLE 4

| | Resin composition (parts by weight) | | | | Physical properties | | |
|---|---|---|---|---|---|---|---|
| | Polyphenylene ether (A) | Styrene-grafted crystalline propylene polymer composition (B-6) | Homo-polypropylene | Ethylene-propylene[*1] copolymer rubber (C-1) | Izod impact notched (kg · cm/cm) | Heat distortion temperature (4.6 kg/cm$^2$, °C.) | Modulus of flexural elasticity (kg/cm$^2$) |
| Example 18 | 41 | 59 | 0 | 0 | 4 | 150 | 22,300 |
| Example 19 | 41 | 59 | 0 | 8 | 12 | 138 | 19,500 |
| Example 20 | 41 | 0 | (B-3) 59 | 0 | 4 | 137 | 17,600 |

TABLE 4-continued

| | Resin composition (parts by weight) | | | | Physical properties | | |
|---|---|---|---|---|---|---|---|
| | Polyphenylene ether (A) | Styrene-grafted crystalline propylene polymer composition (B-6) | Homopolypropylene | Ethylene-propylene[*1] copolymer rubber (C-1) | Izod impact notched (kg · cm/cm) | Heat distortion temperature (4.6 kg/cm$^2$, °C.) | Modulus of flexural elasticity (kg/cm$^2$) |
| Example 21 | 41 | 0 | (B-3) 59 | 8 | 10 | 121 | 15,200 |
| Example 22 | 41 | 0 | (B-5) 59 | 0 | 2 | 144 | 20,100 |

[*1]Esprene E201 (Trade name, produced by Sumitomo Chemical Co., Ltd.)

TABLE 5

| | Resin composition (parts by weight) | | | | Physical properties | | |
|---|---|---|---|---|---|---|---|
| | Polyphenylene ether (A) | Styrene-grafted crystalline propylene polymer (B-6) | Styrene-grafted homo-polypropylene (B-7) | Ethylene-propylene copolymer rubber | Izod impact notched (kg · cm/cm) | Heat distortion temperature (4.6 kg/cm$^2$, °C.) | Modulus of flexural elasticity (kg/cm$^2$) |
| Example 23 | 41 | 59 | 0 | 0 | 6 | 157 | 23,500 |
| Example 24 | 41 | 59 | 0 | (C-1) 8 | 16 | 149 | 20,600 |
| Example 25 | 41 | 0 | 59 | 0 | 6 | 136 | 18,200 |
| Example 26 | 41 | 0 | 59 | (C-1) 8 | 13 | 126 | 15,900 |
| Example 27 | 41 | 59 | 0 | (C-2)[*1] 8 | 20 | 153 | 21,900 |
| Example 28 | 41 | 0 | 59 | (C-2)[*1] 8 | 11 | 129 | 17,100 |

[*1]Grafted product of Esprene E201 (Trade name, produced by Sumitomo Chemical Co., Ltd.)

TABLE 6

| | Resin composition (wt %) | | | | | Physical properties | | |
|---|---|---|---|---|---|---|---|---|
| | Polyphenylene ether (A) | crystalline propylene polymer (B-5) | Homo-polypropylene (B-3) | Rubbery substance[*1] | Polyamide[*2] | Izod impact notched (kg · cm/cm) | Heat distortion temperature (4.6 kg/cm$^2$, °C.) | Modulus of flexural elasticity (kg/cm$^2$) |
| Example 29 | 39 | 55 | 0 | 6 | 0 | 13 | 148 | 19,800 |
| Example 30 | 31 | 41 | 0 | 0 | 28 | 5 | 160 | 21,500 |
| Example 31 | 39 | 0 | 55 | 6 | 0 | 13 | 129 | 16,900 |
| Example 32 | 31 | 0 | 41 | 0 | 28 | 4 | 145 | 19,700 |

[*1]Styrene-butadiene copolymer rubber; Cariflex TR1116 (Trade name, produced by General Electric Co., Ltd.)
[*2]Nylon-6, A-1020BRL (Trade name, produced by Unitika Co., Ltd.)

TABLE 7

| | Resin composition (wt %) | | | | | Physical properties | | |
|---|---|---|---|---|---|---|---|---|
| | Polyphenylene ether (A) | Styrene-grafted crystalline propylene polymer (B-6) | Styrene-grafted homo-polypropylene (B-7) | Espren E201 (C-1) | Polystyrene[*1] | Izod impact notched (kg · cm/cm) | Heat distortion temperature (4.6 kg/cm$^2$, °C.) | Modulus of flexural elasticity (kg/cm$^2$) |
| Example 33 | 39 | 55 | 0 | 6 | 0 | 15 | 150 | 21,500 |
| Example 34 | 31 | 41 | 0 | 0 | 28 | 5 | 164 | 23,200 |
| Example 35 | 39 | 0 | 55 | 6 | 0 | 14 | 133 | 17,300 |
| Example 36 | 31 | 0 | 41 | 0 | 28 | 4 | 147 | 21,600 |

[*1]Esbrite 8 (Trade name, produced by Sumitomo Chemical Co., Ltd.)

TABLE 8

| | Resin composition (wt %) | | | | Physical properties | |
|---|---|---|---|---|---|---|
| | Polyphenylene ether (A) | Highly crystalline polypropylene (B-8) | Styrene-grafted highly crystalline polypropylene (B-12) | Polypropylene (B-14) | Heat distortion temperature (4.6 kg/cm$^2$, °C.) | Modulus of flexural elasticity (kg/cm$^2$) |
| Example 37 | 43 | 57 | 0 | 0 | 162 | 17,300 |
| Example 38 | 43 | 0 | 57 | 0 | 171 | 18,200 |
| Example 39 | 43 | 0 | 0 | 57 | 148 | 15,900 |

TABLE 9

| | Resin composition (parts by weight) | | | | | Physical properties | | |
|---|---|---|---|---|---|---|---|---|
| | Polyphenylene ether (A) | Highly crystalline polypropylene | Styrene-grafted highly crystalline polypropylene (B-13) | Polypropylene | Rubbery substance[*1] (C-1) | Izod impact notched (kg · cm/cm) | Heat distortion temperature (4.6 kg/cm$^2$, °C.) | Modulus of flexural elasticity (kg/cm$^2$) |
| Example 40 | 40 | (B-8) 50 | 0 | 0 | 10 | 7 | 143 | 16,500 |
| Example 41 | 40 | (B-9) 50 | 0 | 0 | 10 | 8 | 147 | 16,800 |
| Example 42 | 40 | (B-10) 50 | 0 | 0 | 10 | 6 | 151 | 17,400 |

TABLE 9-continued

| | Resin composition (parts by weight) | | | | | Physical properties | | |
|---|---|---|---|---|---|---|---|---|
| | Polyphenylene ether (A) | Highly crystalline polypropylene | Styrene-grafted highly crystalline polypropylene (B-13) | Polypropylene | Rubbery substance[1] (C-1) | Izod impact notched (kg·cm/cm) | Heat distortion temperature (4.6 kg/cm², °C.) | Modulus of flexural elasticity (kg/cm²) |
| Example 43 | 40 | (B-11) 50 | 0 | 0 | 10 | 5 | 159 | 19,100 |
| Example 44 | 40 | 0 | (B-13) 50 | 0 | 10 | 19 | 164 | 21,800 |
| Example 45 | 40 | 0 | 0 | (B-14) 50 | 10 | 6 | 135 | 14,800 |
| Example 46 | 40 | 0 | 0 | (B-15) 50 | 10 | 5 | 146 | 16,700 |

[1]Sumitomo Esprene E201 [Trade name, produced by Sumitomo Chemical Co., Ltd.; $ML_{1+4}$ 121° C. = 27, ethylene-propylene copolymer rubber (propylene content 53 wt %)]

What is claimed is:

1. A thermoplastic resin composition consisting essentially of:
   (a) a polyphenylene ether,
   (b) an alkenyl aromatic monomer-grafted propylene polymer, and
   (c) a rubbery substance.

2. A thermoplastic resin composition as claimed in claim 1, wherein said rubbery substance (c) is at least one selected from the group consisting of ethylene-α-olefin copolymer rubber, modified products of ethylene-α-olefin copolymer rubber, ethylene-α-olefin-nonconjugated diene copolymer rubber, modified products of ethylene-α-olefin-nonconjugated diene copolymer rubber, styrene-butadiene random copolymer rubber, styrene-butadiene-styrene block copolymer rubber, hydrogenated styrene-butadiene block copolymer rubber and hydrogenated styrene-butadiene-styrene block copolymer rubber.

3. A thermoplastic resin composition as claimed in claim 2, wherein said rubbery substance (c) is said ethylene-α-olefin copolymer rubber which is an ethylene-propylene copolymer rubber which has an ethylene content of 15 to 85% by weight, a Mooney viscosity ($ML_{1+4}$121° C.) of 5 to 120, and a glass transient point of not higher than −10° C.

4. A thermoplastic resin composition as claimed in claim 1, wherein said polyphenylene ether (a) is a polyphenylene ether obtained by the oxidative coupling polymerization of at least one phenol compound represented by the general formula

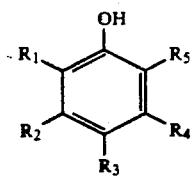

wherein $R_1$, $R_2$, $R_3$, $R_4$ and $R_5$, each represents a hydrogen atom, a halogen atom, a hydrocarbyl group or a substituted hydrocarbyl group, a hydrocarbyloxy group or a substituted hydrocarbyloxy group provided that one of $R_1$, $R_2$, $R_3$, $R_4$ and $R_5$ is always a hydrogen atom.

5. A thermoplastic resin composition as claimed in claim 1, wherein said component (c) is an alkenyl aromatic monomer-grafted rubbery substance.

6. A thermoplastic resin composition as claimed in claim 1, wherein said alkenyl aromatic monomer-grafted propylene polymer is obtained by grafting an alkenyl aromatic monomer onto a highly crystalline propylene homopolymer or block copolymer of propylene having a boiling heptane-insoluble portion, which has an isotactic pentad fraction of at least 0.970.

7. A thermoplastic composition as claimed in claim 6, wherein said propylene homopolymer or said block copolymer has a boiling heptane-soluble portion content of not higher than 5.0% by weight and a xylene-soluble portion content of not higher than 2.0% by weight at 20° C.

8. A thermoplastic resin composition consisting essentially of:
   (a) a polyphenylene ether,
   (b) an alkenyl aromatic monomer-grafted propylene polymer, and
   (c) a rubbery substance;
   wherein the proportion of the component (a) to the sum of component (a) and (b) is 1 to 90% by weight, the proportion of component (b) to the sum of components (a) and (b) is 99 to 10% by weight, and the proportion of component (c) to the sum of components (a) and (b) is 1 to 50 parts by weight per 100 parts by weight of (a) plus (b).

9. A thermoplastic resin composition as claimed in claim 8, wherein said component (a) is a polyphenylene ether obtained by the oxidative coupling polymerization of at least one phenol compound represented by the general formula

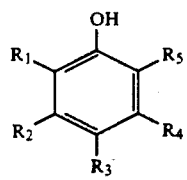

wherein $R_1$, $R_2$, $R_3$, $R_4$ and $R_5$ each represents a hydrogen atom, a halogen atom, a hydrocarbyl group, a substituted hydrocarbyl group, a hydroxycarbyloxy group or a substituted hydrocarbyloxy group provided that one of $R_1$, $R_2$, $R_3$, $R_4$ and $R_5$ is always a hydrogen atom;
wherein the alkenyl aromatic monomer of component (b) is a monomer represented by the general formula

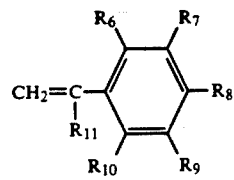

wherein $R_6$, $R_7$, $R_8$, $R_9$ and $R_{10}$ each represent a hydrogen atom, a halogen atom, an unsubstituted or substituted hydrocarbyl group, or an unsubstituted or substituted hydrocarbyloxy group, and $R_{11}$ represents a hydrogen atom, or a lower alkyl group having 1 to 4 carbon atoms; and wherein said component (c) is at least one member selected from the group consisting of ethylene-α-olefin copolymer rubber, modified products of ethylene-α-olefin copolymer rubber, ethylene-α-olefin-nonconjugated diene copolymer rubber, modified products of ethylene-α-olefin-nonconjugated diene copolymer rubber, styrene-butadiene random copolymer rubber, styrene-butadiene-styrene block copolymer rubber, hydrogenated styrene-butadiene block copolymer rubber and hydrogenated styrene-butadiene-styrene block copolymer rubber.

10. A thermoplastic resin composition as claimed in claim 9, wherein said phenol compound of said component (a) is selected from the group consisting of phenol, o-cresol, m-cresol, p-cresol, 2,6-dimethylphenol, 2,5-dimethylphenol, 2,4-dimethylphenol, 3,5-dimethylphenol, 2-methyl-6-phenylphenol, 2,6-diphenylphenol, 2,6-diethylphenol, 2-methyl-6-ethylphenol, 2,3,5-trimethylphenol, 2,3,6-trimethylphenol, 2,4,6-trimethylphenol, 3-methyl-6-tert-butylphenol, thymol, and 2-methyl-6-allylphenol.

11. A thermoplastic resin composition as claimed in claim 9, wherein said component (a) is selected from the group consisting of homopolymers of 2,6-dimethylphenol, homopolymers of 2,6-diphenylphenol, copolymers of 2,6-dimethylphenol and 3-methyl-6-tert-butylphenol, and copolymers of 2,6-dimethylphenol and 2,3,6-trimethylphenol.

12. A thermoplastic resin composition as claimed in claim 8, wherein said component (c) is an alkenyl aromatic monomer-grafted rubbery substance.

13. A thermoplastic resin composition as claimed in claim 8, wherein said alkenyl aromatic monomer-grafted propylene polymer is obtained by grafting an alkenyl aromatic monomer onto a highly crystalline propylene homopolymer or block copolymer of propylene having a boiling heptane-insoluble portion, which has an isotactic pentad fraction of at least 0.970.

* * * * *